June 26, 1928.

J. K. DUNCAN 1,674,892

CONTROL MEANS FOR SWITCHES

Filed Sept. 2, 1927

JAMES K. DUNCAN,
INVENTOR.

BY Harold C. Shipman
ATTORNEY.

June 26, 1928.
J. K. DUNCAN
1,674,892
CONTROL MEANS FOR SWITCHES
Filed Sept. 2, 1927    5 Sheets-Sheet 3
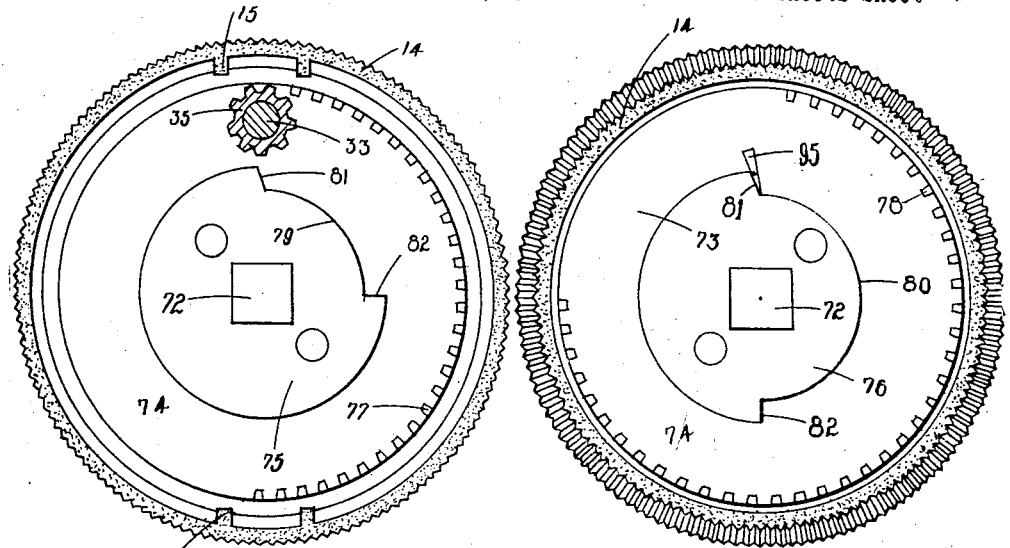
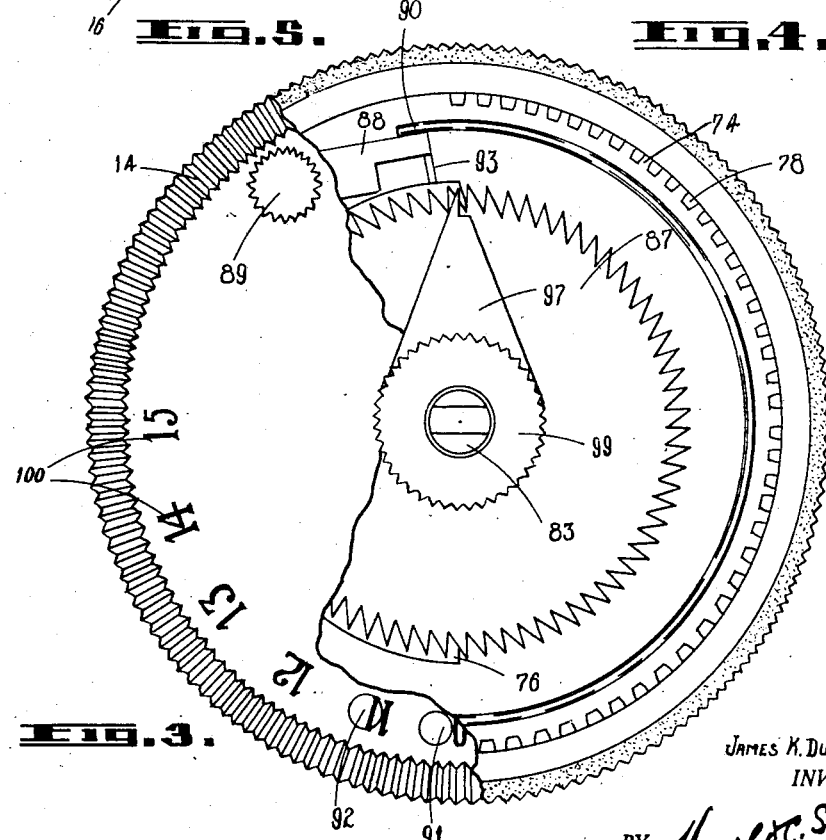

June 26, 1928.
J. K. DUNCAN
1,674,892
CONTROL MEANS FOR SWITCHES
Filed Sept. 2, 1927
5 Sheets-Sheet 4
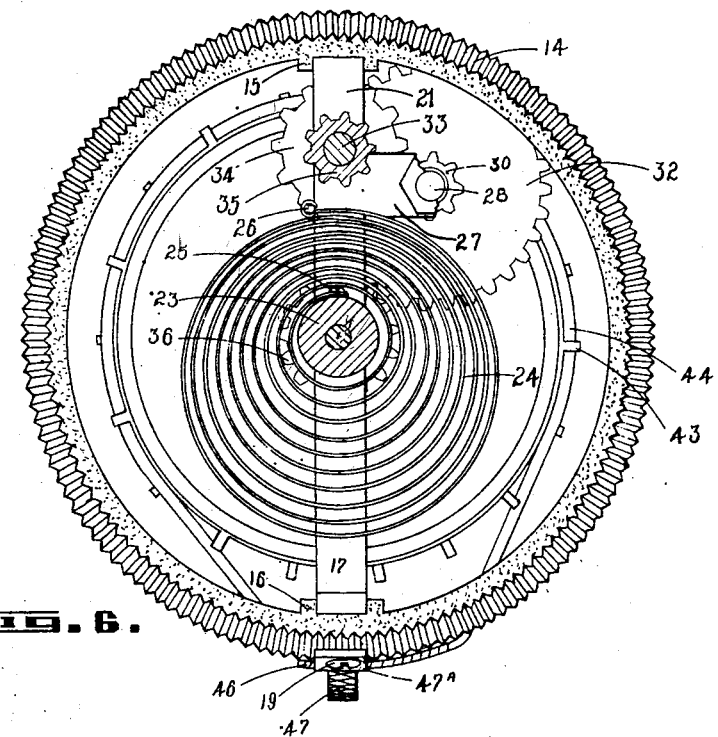
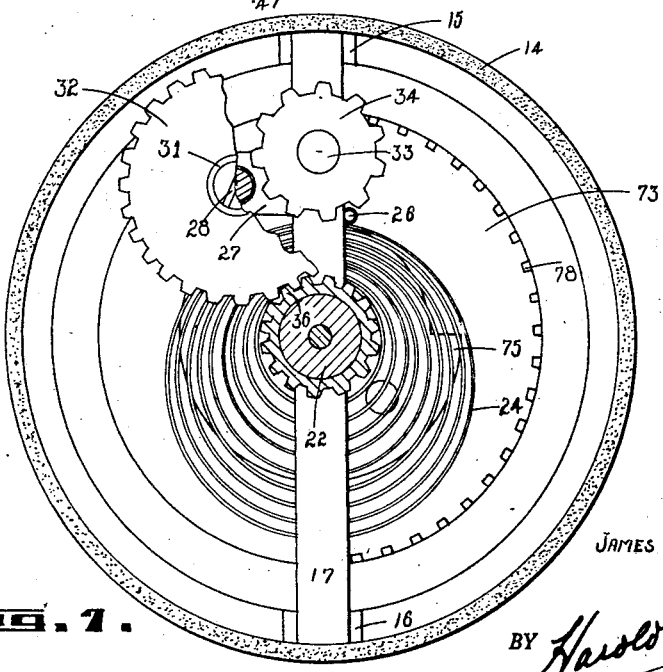
JAMES K. DUNCAN
INVENTOR.
BY Harold C. Shipman
ATTORNEY.

June 26, 1928.

J. K. DUNCAN 1,674,892

CONTROL MEANS FOR SWITCHES

Filed Sept. 2, 1927

JAMES K. DUNCAN,
INVENTOR.

BY Harold C. Shipman
ATTORNEY.

Patented June 26, 1928.

1,674,892

UNITED STATES PATENT OFFICE.

JAMES K. DUNCAN, OF ALMONTE, ONTARIO, CANADA.

CONTROL MEANS FOR SWITCHES.

Application filed September 2, 1927. Serial No. 217,172.

This invention relates to control means for switches and embodies an attachment which may be connected on to a body portion of a rotary switch, either of the wall or drop light type for controlling the electric light systems. The same construction may be used in connection with stove switches and other such constructions where it is desired to have the switch turned to on or off position within a predetermined time.

The object of my invention is to provide a control means, adapted to be connected to rotary switches, which control means may be set and the mechanism adjusted. The working parts therein will be so positioned relative to each other that the connection to the switch operating the same will be snapped in the desired direction so as to throw the contact members into off or on position as may be desired.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 3 is a front plan view of the preferred embodiment of my invention with parts broken away to more clearly illustrate the working parts under the outer cover and their relationship to each other.

Fig. 4 is a section view taken on the line 4—4 of Fig. 2, looking in the direction of the arrow.

Fig. 5 is a section view taken on the line 5—5 of Fig. 2, looking in the direction of the arrow.

Fig. 6 is a section view taken on the line 6—6 of Fig. 2, looking in the direction of the arrow.

Fig. 7 is a section view taken on the line 7—7 of Fig. 2, looking in the direction of the arrow.

Like numerals of reference designate corresponding parts throughout the different views.

Figure 8:
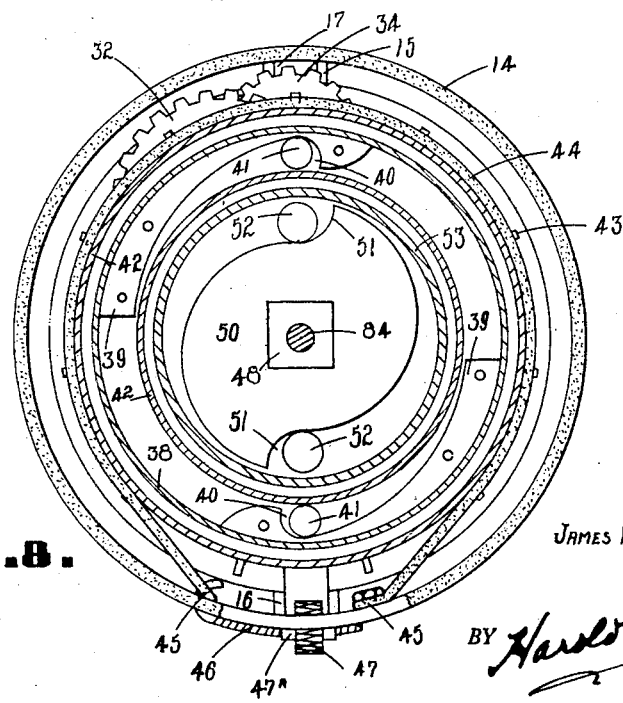
Fig. 8 is a section view taken on the line 8—8 of Fig. 2, looking in the direction of the arrow.

14 indicates the outer casing, which is provided on its inner contour with oppositely positioned pairs of spaced guide members 15 and 16. 17 is a supporting bracket having a bent end 18 adapted to fit intermediate the guide members 16 and secured in fixed relationship thereto by means of the screw bolt 19. The upper end of the supporting bracket 17 is provided with an angularly bent end adapted to fit intermediate the guide members 15 and secured in fixed relationship thereto by means of the screw bolt 20. The inner end of the angularly bent top portion of the supporting bracket 17 is bent downwardly as at 21, the downwardly bent portion 21 being in parallel alignment with the body portion of the supporting bracket 17. Intermediate the ends of the supporting bracket 17, I provide an annular opening through which the main-spring shaft 22 is fitted. This main-spring shaft is provided with an enlarged portion 23 to which one end of the spring 24 is attached by means of the screw bolt 25. This spring 24 is wound around the enlarged portion 23 of the shaft 22 and its outer end is fixedly attached to the arm 26 extending outwardly from and integral with the supporting bracket 17. The supporting bracket 17 is provided with an outwardly protruding side arm 27 into which the screw bolt 28 is threadedly engaged. The inner end of the screw bolt may be provided with a lock nut 29. Rotatably mounted on the screw bolt 28 intermediate the supporting bracket 17 and the head of the screw bolt 28, I provide a pinion gear 30. This pinion gear 30 is provided with a sleeve 31, which is riveted into angular formation to securely engage the gear 32 in fixed relationship to the pinion 30. The downwardly bent portion 21 and the upper portion of the supporting bracket 17 are provided with oppositely registering openings in which the shaft 33 is mounted. At one end of this shaft 33, I provide a gear 34 which is adapted to mesh into engagement with the pinion 30. At the other end of the shaft 33, I provide a gear 35, the purpose of which will hereinafter be mentioned. 36 is a pinion gear rotatably mounted on the main-spring shaft 22. This pinion 36 is provided with a sleeve 37, which is riveted into angular formation to securely engage the central annular portion of the cup-shaped member 38 in fixed relationship to the pinion 36. Referring particularly to Fig. 8, 39 indicate cam members secured to the inner face of the cup-shaped member 38, the outer contour of the same fitting in parallel relationship to the inner contour of the annular side wall of this cup-shaped member 38. These cam members 39 are provided at one end with a pocket portion 40 in which the ratchet balls 41 are normally positioned. 42 is a cover plate having a central annular opening therein adapted to freely rotate on the main-spring shaft 22, in snug relationship to the cup-shaped member 38. The outer contour of the cover plate 42 is provided with an annular channel adjacent its outer circumference to provide the co-acting housing relative to the ratchet balls 41 and the cam members 39. This housing provides a bearing surface opposite the cam members 39, so that when the cup-shaped member 38 is rotated, by the gears and spring hereinbefore mentioned, in an anti-clockwise direction, the ratchet balls 41 will jam between the cam members 39 and the housing portion of the cover plate 42. The housing portion of the cover plate 42 is provided on its outer circumference with outwardly protruding spaced lugs 43. The brake band 44 has one end secured to the inner face of the outer casing 14. This brake band extends around the outer circumference of the cover plate 42, intermediate the spaced lugs 43. The other end of the brake band 44 is provided with a looped end as at 45 into which the hooked end of the adjustment member 46 is positioned. This adjustment member is threaded and extends through the adjustment nut 47, supported in the outer casing 14 by means of the bracket 47ª which is securely held in position by the screw bolt 19. On rotation of the adjustment nut 47 in one direction, the brake band 44 may be loosened, while on rotation of the adjustment nut 47 in the opposite direction, the brake band 44 will be tightened. The main-spring shaft is provided with a squared end portion 48, on which the washer 49 is fitted in snug relationship to the cover plate 42, so as to retain the same in its proper position on the main-spring shaft 22. 50 is a clutch member having its outer contour so formed as to provide two oppositely positioned cam faces. At the end of each of these cam faces, I provide a pocket 51 in which the clutch balls 52 are normally positioned. The clutch member 50 is provided with a squared central opening fitted over the squared end portion 48. 53 is a cup-shaped member, the inner face of the outer contour co-acting with the clutch member 50, so that when the squared end portion 48 is turned anti-clockwise during the winding up of the spring, the clutch balls 52 will jam between the cam faces of the clutch member 50 and the inner face of the outer contour of the cup-shaped member 53, the purpose of which will be hereinafter mentioned.

54 is an insulation member having cast therein the nut 55 and an engagement member 56. The nut 55 is provided with a threaded opening 57. The engagement member 56 is provided with a threaded opening 58. 59 are set screws threadedly engaged through the engagement member 56 at right angles and adapted to protrude through the side of the threaded opening 58 when desired for use. The inner shoulder formed on the insulation member 54 abuts the central annular opening of the cup-shaped member 53 so as to retain it in snug relationship to the clutch member 50. 60 is a U-shaped attachment member having an enlarged central portion 61 preferably of annular shape. This central portion 61 is provided with a slot 62 having slots 63 at opposite sides thereof. The central portion 61 of the U-shaped attachment member is positioned over the insulation member 54, so as to snugly fit against the cup-shaped member 53. Bolts 64 extend outwardly through the cup-shaped member 53 and through the openings 63 and by means of the nuts 65, the U-shaped member 60 is securely fixed to the cup-shaped member 53. The side members 66 of the U-shaped member 60 are designed to straddle the switch housing 67, when the preferred embodiment of my switch control is properly positioned on the switch housing 67 and the rotary shaft of the switch structure properly engaged in the threaded opening 58. 68 is an annular collar preferably composed of spaced bands with integral web portions joining the two therebetween. Intermediate the bands forming the collar 68 and over each of the side members 66, I provide a rectangularly-shaped nut 69, the ends of which normally bear upwardly on the inner surface of the spaced bands forming the collar 68. 70 is a set screw threadedly engaged through the nut 69 and having its inner end pocketed in a pressure plate 71. When the set screw 70 is turned in the desired direction, the side members 66 will be securely engaged against the outer contour of the switch housing 67.

Figure 1:
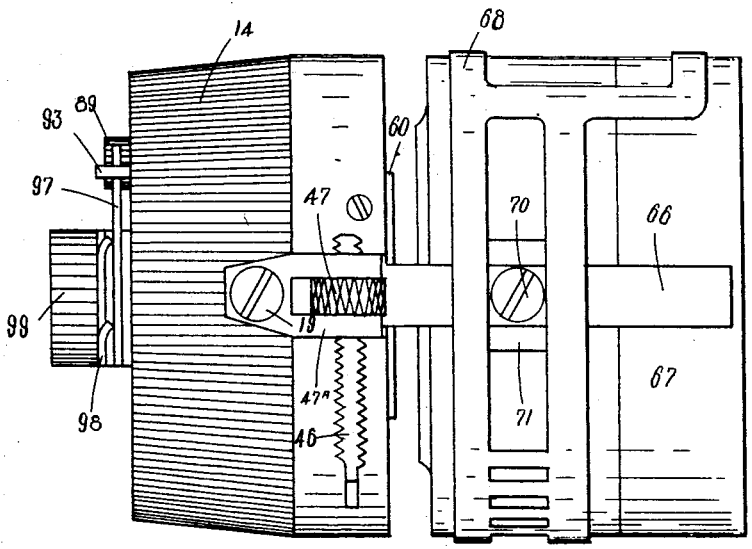
Fig. 1 is a side plan view of the body portion of a wall switch to which the preferred embodiment of my invention is shown as being attached thereto.
Figure 12:
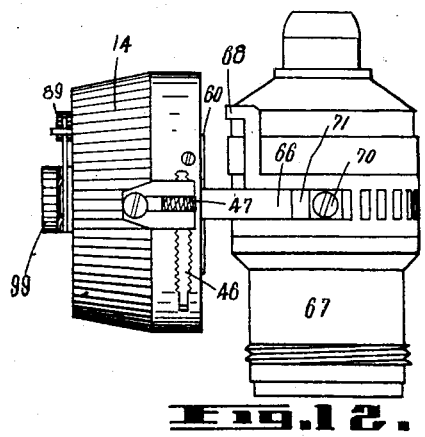
Fig. 12 shows a side elevation of the general type of drop switches, with the preferred embodiment of my invention attached thereto.
Figure 13:
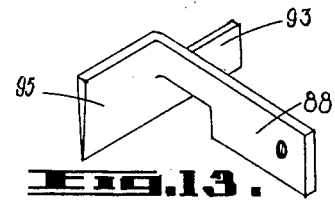
Fig. 13 illustrates the pawl used in the preferred embodiment of my invention.
Figure 10:
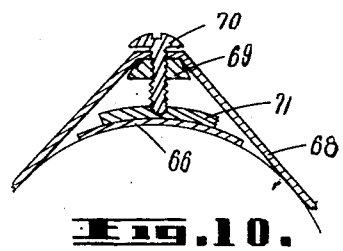
Fig. 10 is an enlarged detail view of the method of tightening the preferred embodiment of my invention to a switch construction.
Figure 11:
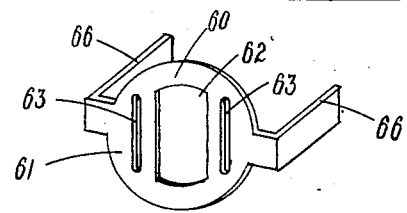
Fig. 11 is an enlarged detail view showing the connection between the control means to the body portion of a switch.
Figure 2:
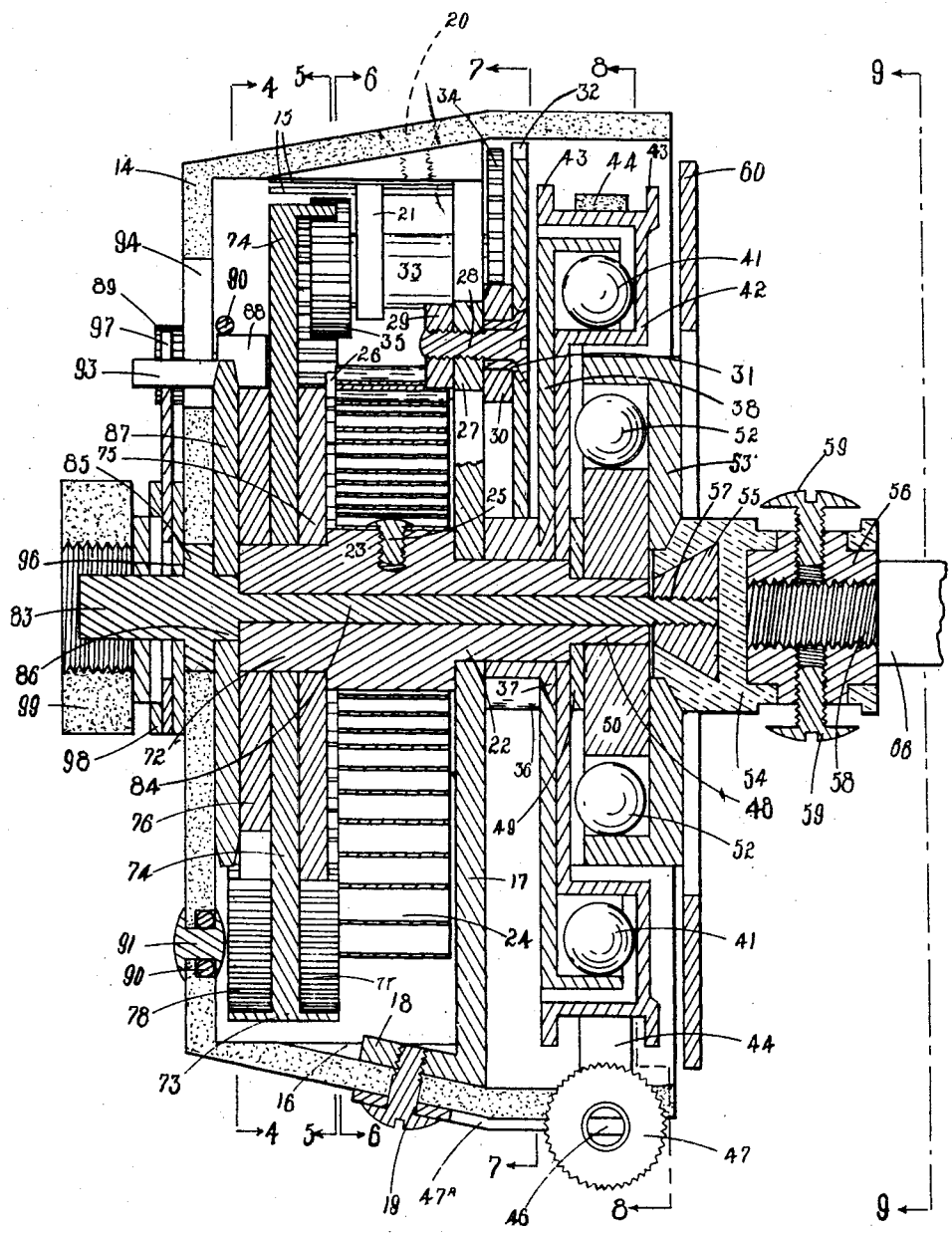
Fig. 2 is an enlarged detail transverse sectional view.
Figure 9:
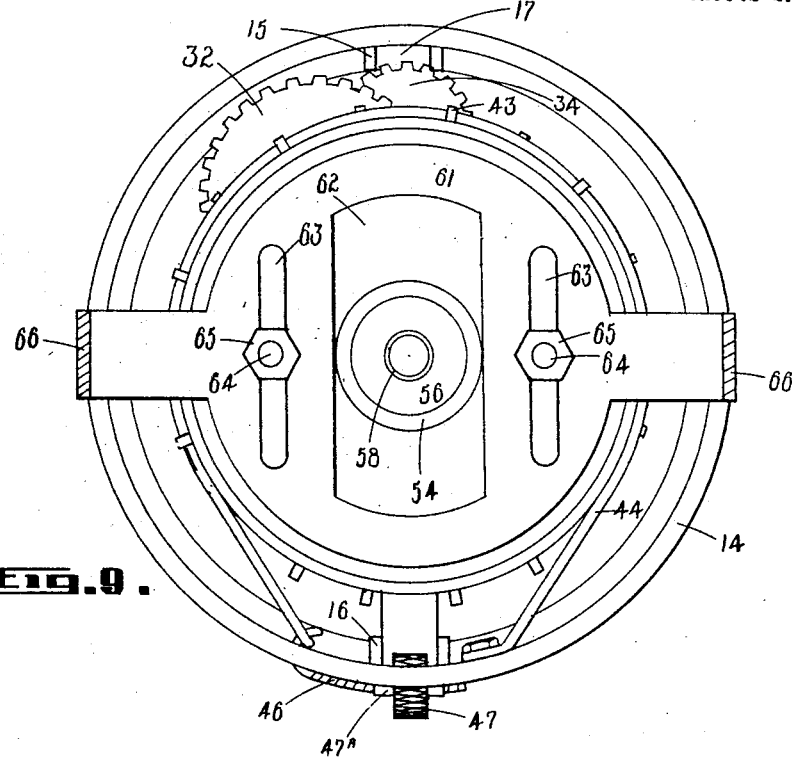
Fig. 9 is an end view taken on the line 9—9 of Fig. 2, looking in the direction of the arrow.

Referring to Fig. 12, showing the preferred embodiment of my invention engaged to a drop socket, it will be noted that the control member is on the side of the socket instead of being in alignment with the same as shown in Fig. 1. In this particular case, the side members 66 extend in alignment with the spaced bands forming the collar 68 instead of being positioned at right angles thereto. In a drop socket, the turning shaft is generally slightly smaller and flattened at the end. When my control is used in connection with a turning stem of this nature, the same is positioned in the threaded opening 58 and the set screws 59 turned down evenly so as to tightly engage the turning stem and retain it centrally of the opening 58. The outer contour of some of the drop switches are of different shapes to that shown in the illustration, Fig. 12 and the shape of the collar 68 co-acting with the slot 62 and the slots 63 provide a means whereby the collar 68 may be adjusted to different positions on the switch to conform with the shape thereof and the central portion 61 slid up or down on the bolts 64, so as to properly retain my control means in its proper position relative to the switch, so that the cup-shaped member 53 will be retained in proper fixed relationship to the switch housing 67. Extending outwardly from the enlarged portion 23 of the main-spring shaft 22, I provide a squared end portion 72 on which is positioned a release member 73 composed of a central portion 74 having pawl guides 75 and 76 securely fixed thereto either as an integral member or by riveting. The outer contour of the central portion 74 is of annular formation and is provided with oppositely directed rack teeth 77 and 78. The pawl guide 75 has one-quarter of its outer contour reduced as at 79, while the pawl guide 76 has one-half of its outer contour reduced as at 80. It will be noted that the upper shoulder 81 of each of the pawl guides 75 and 76 are slightly bevelled while the lower shoulder 82 provides a squared face abutment. It will be noted that on the side of the release member 73 where the pawl guide 75 is provided with a quarter reduced portion 79 that the rack teeth 77 extend around only one-half of the outer contour of the central portion 74, while on the other side of the release member 73 where the pawl guide 76 is provided with a half reduced portion 80, that the rack teeth 78 extend around three-quarters of the outer contour of the central portion 73. The purpose of this co-acting formation will be hereinafter mentioned. The gear 35 is adapted to mesh in contact with either of the rack teeth 77 or 78 when the same are positioned for contact therewith. 83 is the enlarged head portion of the central shaft 84, which shaft extends centrally through the main-spring shaft 22, the end of which shaft 22 is threadedly engaged in the threaded opening 57. This head 83 is provided with an annular flanged portion 85, which snugly fits into the central annular opening in the face of the outer casing 14. The portion of the head 86 inside the flanged portion 85 is of squared formation. 87 is a ratchet wheel having a squared central opening, so that the wheel may be mounted in fixed relationship to the squared portion 86. 88 is a pawl pivotally mounted on the pin 89, which pin is provided with an enlarged outer head, which head may be turned to raise the engagement end of the pawl sufficient to permit the continuous rotation of the outer casing to relieve the tension on the spring 24. The engagement end of the pawl is tensioned downwardly by means of a spring 90, one end of which is engaged to the inner face of the outer casing by means of the rivets 91 and 92. The spring curves around approximately parallel with the working parts inside the outer casing 14 and is adapted to tension against the engagement end of the pawl 88 during its travel. The engagement end of the pawl 88 is bent at right angles to the main portion thereof, so as to provide a lug 93 which will extend outwardly through the opening 94 in the face of the outer casing 14. The other bevelled portion 95 of the engagement end is wedge-shaped as clearly shown in Fig. 13 and is adapted to travel on the outer contour of the pawl guide 75 or 76, depending on which one is in use. The rack teeth on the outer contour of the ratchet wheel 87 have a depth equal to the reduction in radius between the main portion of either of the pawl guides 75 or 76 and their respective reduced portions 79 and 80.

The portion of the enlarged head 83 outwardly of the flanged portion 85 has two opposite segment portions removed so as to provide opposite flat surfaces over which the washer 96 is positioned to contact against the flanged portion 85 and the outer face of the outer casing 14. The opposite sides of this outer end portion are threaded. 97 is an indicator having a central annular opening adapted to be positioned over the outer end 83 and in snug relationship to the washer 96. 98 is a spring washer having contacting fingers engageable against the indicator 97 so as to retain the same in frictional engagement against the washer 96. 99 is a nut threadedly engaged on the outer end of the enlarged head portion 83 and adapted to tighten up against the spring washer 98. The outer face of the outer casing 14 is provided with indication numbers thereon, such as 100, which indications may designate time limits or spaces of time.

When my control means is properly positioned on a switch housing and I desire to set the same, so that it will rotate the switch mechanism, for example 10 minutes, I turn the outer casing 14 anti-clockwise until the indication number 10 comes opposite the indicator 97. During this anti-clockwise movement of the outer casing, the supporting bracket 17 engageable at its ends with the outer casing 14, rotates freely on the main-spring shaft 22 and tensions up the spring 24 by such turning. When the spring 24 is being tightened up, the end held by the screw bolt 25 tends to turn the main-spring shaft 22 anti-clockwise. The clutch balls 52 wedge intermediate the clutch member 50 and the inner face of the outer contour of the cup-shaped member 53. In view of the fact that the cup-shaped member 53 is fixedly connected with the switch housing 67, the main-spring shaft 22 will be retained against turning. The outer casing 14 is then released and the tension of the spring 24 tends to unwind in clockwise direction carrying with it the supporting bracket 17, from which is supported the gear 35. As the outer casing rotates in clockwise direction the gear 35, being in mesh with the rack teeth 77, will be rotated anti-clockwise causing the gear 34 to rotate anti-clockwise, causing the pinion 30 to rotate in clockwise direction, causing the gear 32 to rotate in clockwise direction, causing the pinion 36 to rotate in anti-clockwise direction, causing the cup-shaped member 38 to rotate in anti-clockwise direction, causing the cams 39 to bind the ratchet balls 41 against the housing portion of the cover plate 42 around which the brake band 44 is fitted. The brake band will be adjusted to a pre-determined tension calculated to permit the cover plate 42 to rotate in anti-clockwise direction at a predetermined speed to correspond and work in combination with the indication numbers 100. As the outer casing 14 rotates in clockwise direction, the bevelled portion 95 of the pawl 88 travels on the greater curvature of the pawl guide 76 until in alignment with the upper shoulder 81. When in this position the tension spring 90, acting on the pawl 88, forces the bevelled portion 95 inwardly towards the reduced portion 80 and at the same time engages with the ratchet wheel 87. The rack teeth 77 are so positioned relative to the gear 35 that the gear 35 disengages the rack teeth 77. The bevelled portion 95 drops into engagement with the ratchet wheel 87. Immediately the gear 35 is released from rotation over the rack teeth 77, there will be nothing to hold the outer casing 14 against the tension of the spring 24 and it will immediately rotate a half-turn, stopping when the bevelled portion 95 of the pawl 88 contacts with the squared attachment of the lower shoulder 82 of the pawl guides 76. As the outer casing 14 rotates this half-turn, the bevelled portion 95 of the pawl 88 rotates the ratchet wheel 87 in a clockwise direction, which ratchet wheel 87 rotates the squared portion 86, the central shaft 84, the nut 55, the insulation member 54, the engagement member 56 and any stem or turning shaft of a switch which may be connected in the opening 58.

The foregoing paragraph describes the operation of my device when used in connection with a switch requiring a half turn throw. When my device is to be used in connection with a switch requiring a quarter turn throw, the release member 73 will be reversed on the squared end portion 72, which will place the rack teeth 78 in a path of travel to mesh with the gear 35. As the outer casing 14 rotates in clockwise direction, the bevelled portion 95 of the pawl 88 travels on the greater curvature of the pawl guide 75 until in alignment with the upper shoulder corresponding to the shoulder 81 on the pawl guide 76. When in this position, the rack teeth 78 are so positioned to the gear 35 that the gear 35 disengages the rack teeth 78. The reduced portion 79 will permit the pawl 88 to rotate the ratchet wheel 87 a quarter turn, thus causing a quarter turn throw to any stem or turning shaft of the switch which may be connected in the opening 58, in a similar manner to that referred to in the previous paragraph.

If desirous on immediately turning the switch in a clockwise direction to either turn the switch mechanism on or off, it is only necessary to turn the outer casing 14 in a clockwise direction, the bevelled portion 95 of the pawl 88 being normally engaged in the ratchet wheel 87, which co-acts with the several parts which were hereinbefore mentioned to turn the engagement member 56.

The foregoing specification and annexed drawings disclose the preferred embodiment of my invention, but it is to be understood that minor changes may be resorted to in the commercial adaptation of my invention without departing from the scope of the invention as hereinbefore claimed.

What I claim as new is:

1. A switch control, comprising a rotatably mounted outer casing; a spring rotatably supported on a shaft inside said casing and having a winding connection to said casing; a means for retaining said shaft against turning when said spring is being wound; a means for controlling the unwinding of said spring at a pre-determined rate of speed for a predetermined time; a switch stem operating means and a means for rotating said switch stem operating means at the termination of said pre-determined time.

2. Same as claim 1, characterized in that said outer casing and its co-acting parts being turned in a contra-winding direction will operate said switch stem operating means.

3. Same as claim 1, characterized in that said outer casing is provided with indications on its outer face and a registering indicator co-acting therewith.

4. Same as claim 1, characterized in that said control is provided with an adjustable means for connecting said control to various types of switches.

5. Same as claim 1, characterized in that a means is provided for adjusting said means for controlling the unwinding of said spring.

In testimony whereof, I affix my signature.

JAMES K. DUNCAN.